(12) United States Patent
Tsirkin et al.

(10) Patent No.: US 10,185,679 B2
(45) Date of Patent: Jan. 22, 2019

(54) MULTI-QUEUE DEVICE ASSIGNMENT TO VIRTUAL MACHINE GROUPS

(71) Applicant: Red Hat Israel, Ltd., Ra'anana (IL)

(72) Inventors: Michael Tsirkin, Yokneam Illit (IL); Marcel Apfelbaum, Afula (IL)

(73) Assignee: Red Hat Israel, Ltd., Ra'anana (IL)

( * ) Notice: Subject to any disclaimer, the term of this patent is extended or adjusted under 35 U.S.C. 154(b) by 221 days.

(21) Appl. No.: 15/052,391

(22) Filed: Feb. 24, 2016

(65) Prior Publication Data

US 2017/0242811 A1 Aug. 24, 2017

(51) Int. Cl.
  *G06F 9/46* (2006.01)
  *G06F 13/28* (2006.01)
  *G06F 12/10* (2016.01)
  *G06F 9/455* (2018.01)

(52) U.S. Cl.
  CPC .......... *G06F 13/28* (2013.01); *G06F 9/45558* (2013.01); *G06F 12/10* (2013.01); *G06F 2009/45579* (2013.01); *G06F 2212/1041* (2013.01); *G06F 2212/657* (2013.01)

(58) Field of Classification Search
  CPC ...... G06F 13/28; G06F 12/10; G06F 9/45558; G06F 2212/1041; G06F 2212/657; G06F 2009/45579
  See application file for complete search history.

(56) References Cited

U.S. PATENT DOCUMENTS

| 7,467,381 | B2 | 12/2008 | Madukkarumukumana et al. |
| 7,478,173 | B1 | 1/2009 | Delco |
| 7,552,419 | B2 | 6/2009 | Zimmer et al. |
| 8,739,177 | B2 | 5/2014 | Qian et al. |
| 9,600,313 | B2* | 3/2017 | Nimmagadda ....... G06F 9/5077 |
| 2002/0144077 | A1* | 10/2002 | Andersson ............ G06F 12/145 711/203 |
| 2006/0069828 | A1 | 3/2006 | Goldsmith |
| 2006/0294517 | A1 | 12/2006 | Zimmer et al. |

(Continued)

OTHER PUBLICATIONS

Crossbow: From Hardware Virtualized NICs to Virtualized Networks published Aug. 17, 2009 by Sunay Tripathi, Nicolas Droux, Thirumalai Srinivasan, Kais Belgaied (9 pages).

(Continued)

*Primary Examiner* — Lewis A Bullock, Jr.
*Assistant Examiner* — Kevin X Lu
(74) *Attorney, Agent, or Firm* — K&L Gates LLP

(57) ABSTRACT

A system and method of device assignment includes receiving an assignment request to assign a device to a plurality of guest virtual machines. The plurality of guest virtual machines includes a first guest virtual machine with a first guest memory having a first physical address and a second guest virtual machine with a second guest memory having a second physical address. The method includes selecting a first bus address offset and a second bus address offset different from the first bus address offset. The method includes sending, to the first guest virtual machine, the first bus address offset, and sending, to the second guest virtual machine, the second bus address offset. The method includes updating a mapping to the first physical address to include the first bus address offset, and updating a mapping to the second physical address to include the second bus address offset.

20 Claims, 6 Drawing Sheets

(56) References Cited

U.S. PATENT DOCUMENTS

| | | | |
|---|---|---|---|
| 2008/0288661 A1* | 11/2008 | Galles | G06F 13/10 |
| | | | 710/3 |
| 2012/0072906 A1* | 3/2012 | Tsirkin | G06F 12/1009 |
| | | | 718/1 |
| 2013/0055259 A1* | 2/2013 | Dong | G06F 13/102 |
| | | | 718/1 |
| 2014/0059266 A1 | 2/2014 | Ben-Michael et al. | |
| 2015/0254093 A1* | 9/2015 | Ho | G06F 9/45558 |
| | | | 718/1 |
| 2017/0279672 A1* | 9/2017 | Krishnan | H04L 41/0803 |

OTHER PUBLICATIONS

High Performance Network Virtualization with SR-IOV published Feb. 15, 2012 by Yaozu Dong, Xiaowei Yang, Jianhui Li, Guangdeng Liao, Kun Tian, Haibing Guan (3 pages).
Broadcom Ethernet Network Controller Enhanced Virtualization Functionality published Oct. 2009 (10 pages).

\* cited by examiner

MULTI-QUEUE DEVICE ASSIGNMENT TO VIRTUAL MACHINE GROUPS

BACKGROUND

The present disclosure relates generally to memory management of virtual machines and, more particularly, to multi-queue device assignment to virtual machine groups. Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor. The present disclosure provides improved systems and methods for managing memory and devices in a virtual environment.

SUMMARY

The present disclosure provides new and innovative methods and systems for memory device assignment. For example, the method includes receiving an assignment request, where the assignment request is a request to assign a device to a plurality of guest virtual machines. The plurality of guest virtual machines includes at least a first guest virtual machine and a second guest virtual machine. The first guest virtual machine has a first guest memory, associated with a portion of a host physical memory, and a first physical address. The second guest virtual machine has a second guest memory, associated with a portion of the host physical memory different from the first guest memory, and a second physical address. The method further includes selecting a first bus address offset and a second bus address offset, where the second bus address offset is different from the first bus address offset. The method further includes sending, to the first guest virtual machine, the first bus address offset. The method further includes sending, to the second guest virtual machine, the second bus address offset. The method further includes updating an input-output memory management unit. Updating the input-output-memory management unit includes updating a mapping to the first physical address to include the first bus address offset, and updating a mapping to the second physical address to include the second bus address offset.

Additional features and advantages of the disclosed methods and system are described in, and will be apparent from, the following Detailed Description and the Figures.

DETAILED DESCRIPTION OF EXAMPLE EMBODIMENTS

Figure 1:
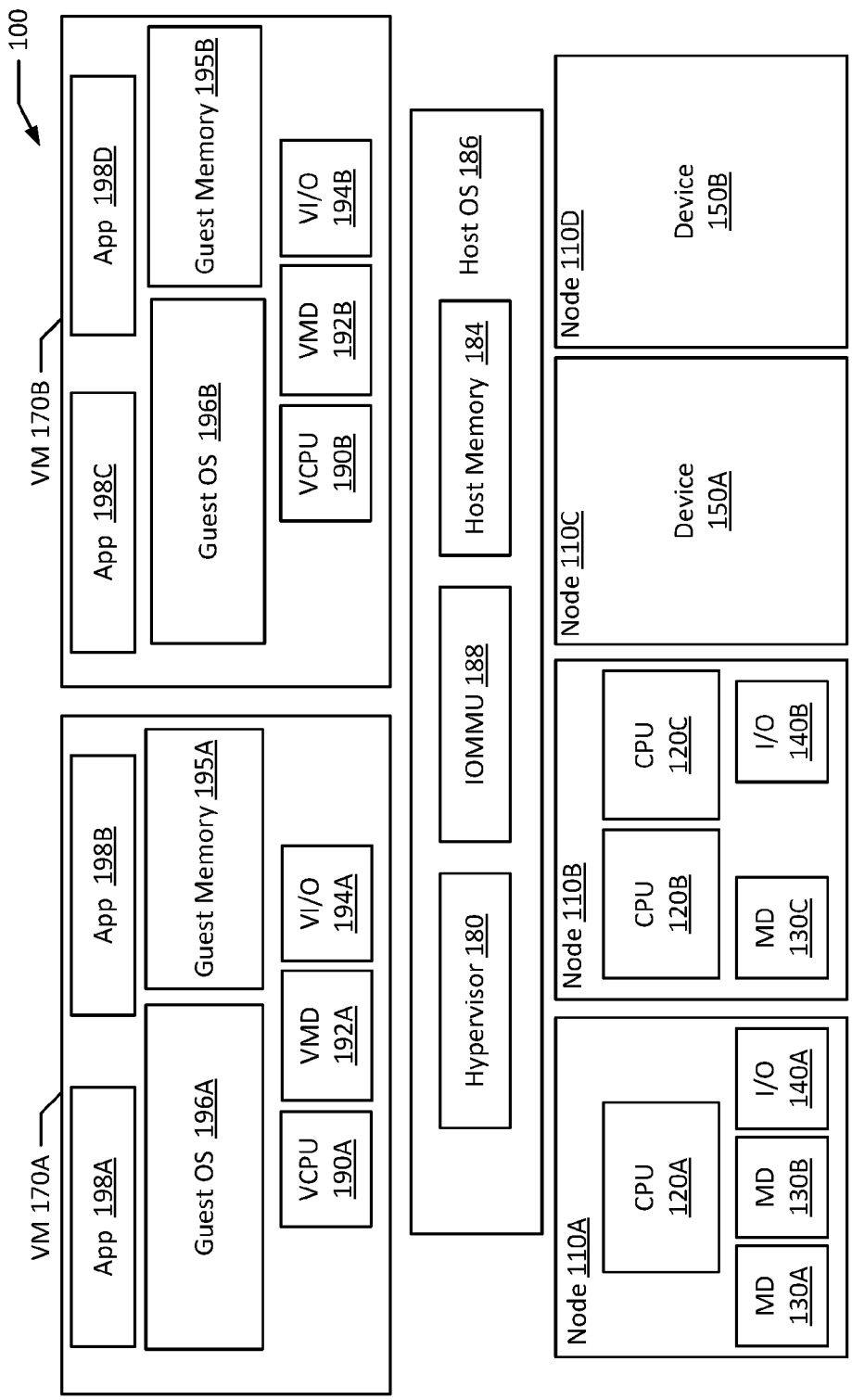
FIG. 1 is a block diagram of an example multi-processor computer system according to an example embodiment of the present disclosure.

In computer systems simultaneously executing multiple virtual machines, it is typical to use a network function virtualization (NFV) system. Each of these virtual machines may or may not have dedicated hardware for distinct network functions. Some of the virtual machines may share hardware for specific functions. Though this is the case with typical virtual machine configurations, a single device function can only be assigned to a single virtual machine. Examples of shared hardware include a network interface controller (NIC) card or a disk.

Most modern devices (e.g., NIC cards, disks, etc.) have multiple hardware queues. With NIC cards, multiple hardware queues may be implemented, for example, including a transmission hardware queue and a receiving hardware queue. These multiple hardware queues may be configured to specify rules on how packets should be handled (e.g., which packets go on which queues). In this way, individual usage of hardware, by a number of different virtual machines, may be scheduled and prioritized. However, since the number of virtual machines may typically be greater than the number of virtual functions, virtual machines are typically still unable to obtain pass-through access to a device (e.g., direct access from the virtual machine to the device). For example, many NIC cards are unable to support single root input-output virtualization (e.g., NIC cards are unable to allow a device, such as a network adapter, separate access to resources among various hardware functions). Rather, virtual machines may be required to go through a bridge (e.g., a networking bridge) and subsequently wait in a hardware queue. Time waited is effectively time lost, thus hardware queues are often a source of inefficiency in NFV systems.

In a typical NFV system, it may be common for a group of virtual machines to trust one another. By establishing mutual trust among the virtual machines, virtual machines can be dedicated to implement specific networking functions (e.g., one virtual machine may be dedicated to a first process, associated with a first device, whereas a second virtual machine may be dedicated to a second process, associated with a second device). Thus, the virtual machines are not competing for access to the same hardware device, and access competition is eliminated. However, establishing mutual trust among the virtual machines does not fix problems associated with device access and hardware queue inefficiencies. The present disclosure describes systems and methods enabling multiple virtual machines that do not require memory protection from each other to share a single hardware function (e.g., NIC). Advantageously, no communication or queuing may be necessary between or among the multiple virtual machines. Thus, multiple virtual machines can function and take actions with respect to hardware devices both simultaneously and in parallel. By allowing more virtual machines to use assigned devices, existing hardware is more effectively utilized in the NFV system.

FIG. 1 depicts a high-level component diagram of an example multi-processor computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a hardware device 150A-B. In an example embodiment, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processors 120A-C refer to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example embodiment, a processor may be a single core processor which is typically capable of executing one instruction at a time (or process a single pipeline of instructions), or a multi-core processor which may simultaneously execute multiple instructions. In another example embodiment, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, input/output device 140A-B refers to a device capable of providing an interface between one or more processors and an external device. The external device's operation is based on the processor inputting and/or outputting data.

Processors 120A-C may be interconnected using a variety of techniques, ranging from a point-to-point processor interconnect, to a system area network, such as an Ethernet-based network. Local connections within each node 110A-D, including the connections between a processor 120A and a memory device 130A-B and between a processor 120A and an I/O device 140A, may be provided by one or more local buses of suitable architecture, for example, peripheral component interconnect (PCI). As used herein, a device of the host operating system (host OS) 186 (or host device) may refer to CPU 120A-C, MD 130A-C, I/O 140A-B, a software device, and/or hardware device 150A-B.

As noted above, computer system 100 may run multiple guest virtual machines (e.g., VM 170A-B), by executing a software layer (e.g., hypervisor 180) above the hardware and below the guest virtual machines 170A-B, as schematically shown in FIG. 1. In an example embodiment, the hypervisor 180 may be a component of the host operating system 186 executed by the computer system 100. In another example embodiment, the hypervisor 180 may be provided by an application running on the host operating system 186, or may run directly on the computer system 100 without an operating system beneath it. The hypervisor 180 may virtualize the physical layer, including processors, memory, and I/O devices, and present this virtualization to guest virtual machines 170A-B as devices, including virtual processors (e.g., VCPU 190A-B), virtual memory devices (e.g., VMD 192A-B), and/or virtual I/O devices (e.g., VI/O 194A-B). A virtual machine 170 may run on any type of dependent, independent, compatible, and/or incompatible applications on the underlying hardware and OS 186. In an example embodiment, applications (e.g., App 198A-D) run on a virtual machine 170 may be dependent on the underlying hardware and/or OS 186. In another example embodiment, applications 196A-D run on a virtual machine 170 may be independent of the underlying hardware and/or OS 186. For example, applications 198A-B run on a first virtual machine 170A may be dependent on the underlying hardware and/or OS 186 while applications 198C-D run on a second virtual machine 170B are independent of the underlying hardware and/or OS 186. Additionally, applications 198A-D run on a virtual machine 170 may be compatible with the underlying hardware and/or OS 186. In an example embodiment, applications 198A-D run on a virtual machine 170 may be incompatible with the underlying hardware and/or OS 186. For example, applications 198A-B run on one virtual machine 170A may be compatible with the underlying hardware and/or OS 186 while applications 198C-D run on another virtual machine 170B are incompatible with the underlying hardware and/or OS 186. In an example embodiment, a device may be implemented as a virtual machine 170.

In an example embodiment, a guest virtual machine 170A-B may execute a guest operating system (guest OS) 196A-B which may utilize the underlying VCPU 190A-B, VIVID 192A-B, and VI/O devices 194A-B. One or more applications 198A-D may be running on a guest virtual machine 170A-B under the guest operating system 196A-B. In an example embodiment, a guest virtual machine 170A-B may include multiple virtual processors 190A-B. Processor virtualization may be implemented by the hypervisor 180 scheduling time slots on one or more physical processors 120A-C such that from the guest operating system's perspective those time slots are scheduled on a virtual processor 190A-B.

The hypervisor 180 controls and limits access to memory (e.g., memory allocated to the guest virtual machines 170A-B and memory allocated to the guest operating systems 196A-B, such as guest memory 195A-B provided to guest operating systems 196A-B, etc.). For example, guest memory 195A-B may be divided into a plurality of memory pages. Access to these memory pages is controlled and limited by the hypervisor 180. Likewise, for example, guest memory 195A-B allocated to the guest operating system 196A-B are mapped from host memory 184 such that when a guest application 198A-D or a device (e.g., device 150A) uses or accesses a memory page of guest memory 195A-B it is actually using or accessing host memory 184. Host memory 184 is also referred to as host physical memory 184, as it physically exists on a computer system (e.g., system 100).

The hypervisor 180 may keep track of how each memory page is mapped, allocated, accessed, and/or used through the use of the input-output memory management unit (IOMMU) 188. The IOMMU 188 maps the device address space (e.g., a bus address) that is relevant to the I/O bus into the physical address space (e.g., a host physical address). The device address space may be a virtual machine physical address space, which is mapped by the IOMMU 188 into the physical address space (e.g., a host physical address). In an example embodiment, the IOMMU 188 may support two-layer translation and thus translate the virtual machine virtual addresses to host physical addresses. The IOMMU 188 may also include extra information associated with the address space mapping, such as read and write permissions. For example, mappings in the IOMMU 188 allow a device (e.g., device 150A) to access a particular address (e.g., a physical address or a virtual address). Likewise, for example, mappings can be removed to prevent direct access, by the device, to the particular address. The mechanism of mapping and unmapping an address allows a host, through a hypervisor 180, to control access to a particular host address in host memory 184. As a result, the host can maintain memory integrity by preventing a device from performing illegal transactions or accessing invalid addresses.

In this manner, the hypervisor 180, through the IOMMU 188, can prevent memory allocated to one guest OS 196A from being inappropriately accessed and/or modified by another guest OS 196B or the host OS 186. Accesses are detected by the guest OS (e.g., 196A) in the virtual machine (e.g., VM 170A), which may act as an interface between a host OS (e.g., 186) and the guest OS (e.g., 196A). Similarly, the hypervisor 180, through the IOMMU 188, can prevent memory assigned to or being used by one application 198A from being used by another application 198B. Additionally, the hypervisor 180, through the IOMMU 188, can prevent memory accessible by one node (e.g., 110A) from being used by another node (e.g., 110B). In an example embodiment, the IOMMU 188 is a separate component from the VMs 170A-B, nodes 110A-D, the host OS 186, and the hypervisor 180. In a different example embodiment, the IOMMU 188 is emulated, such that it is included within the host OS 186, and used by the guest OS 196A-B to communicate with the hypervisor 180.

Mappings to memory, stored in the IOMMU 188, are accessible by the hypervisor 180, the VMs 170A-B and each node 110A-D. Through these mappings, the memory itself can be accessed. Likewise, mappings may be used together with any paging data structure used by the VMs 170A-B to support translation from guest OS 196A-B to host OS 186 addresses (e.g., 32-bit linear address space using a two-level hierarchical paging structure, Physical Address Extension mode, INTEL® Extended Memory 64 Technology mode, etc.).

Figure 2:
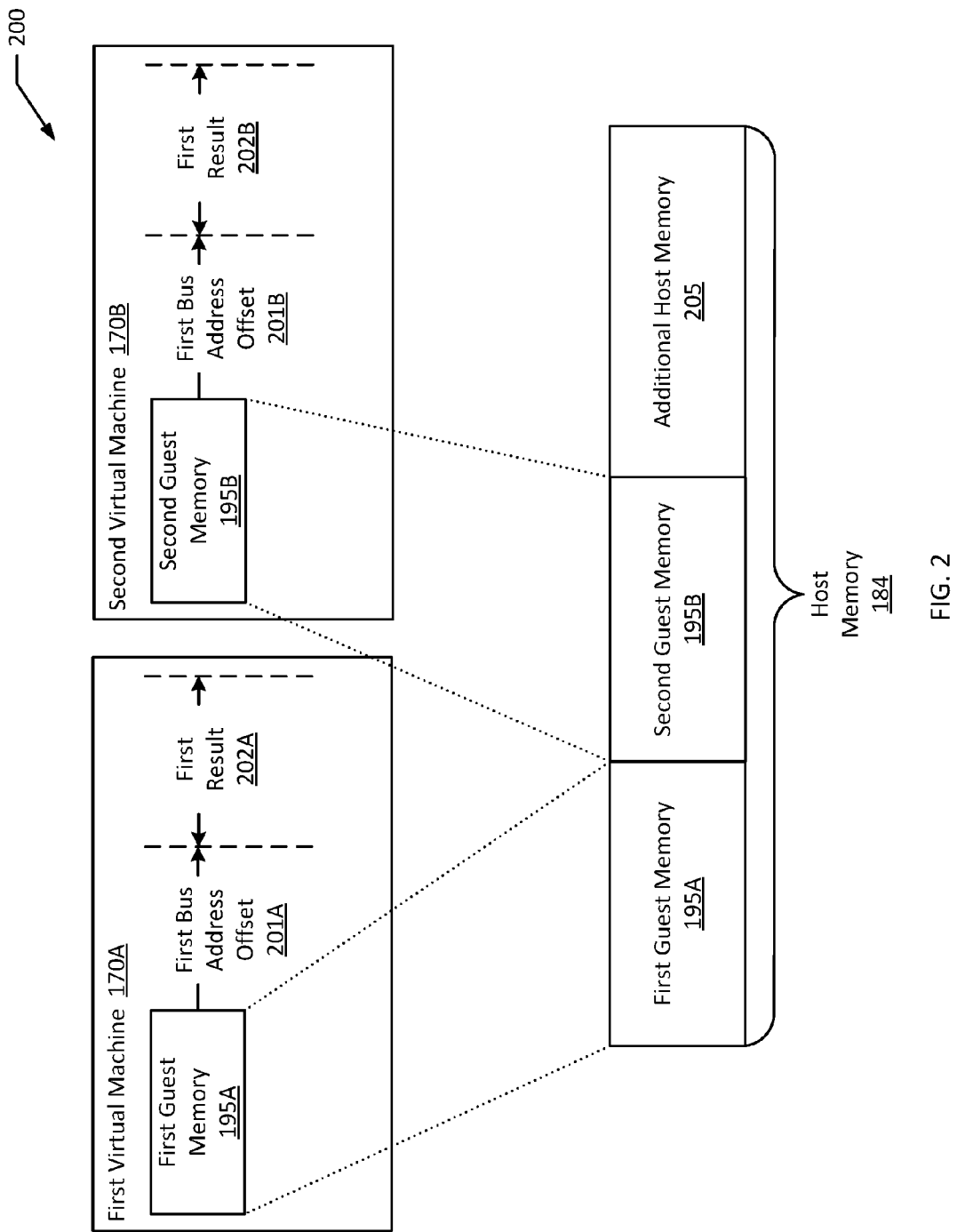
FIG. 2 is a diagram illustrating memory related to bus address offsets according to an example embodiment of the present disclosure.

FIG. 2 is a diagram illustrating memory related to bus address offsets according to an example embodiment of the present disclosure. The memory diagram 200 illustrated by FIG. 2 is a detailed diagram of some of the memory components previously discussed as components of computer system 100. For example, memory diagram 200 includes two virtual machines: a first guest virtual machine 170A and a second guest virtual machine. The first guest virtual machine 170A includes first guest memory 195A. The second guest virtual machine 170B includes second guest memory 195B. Likewise, memory diagram 200 includes host memory 184.

As previously mentioned, for example, guest memory 195A-B allocated to the guest operating system (e.g., guest operating systems 196A-B) for each of the first guest virtual machine 170A and the second guest virtual machine 170B is mapped from host memory 184. Therefore, when an application or a device (e.g., device 150A) uses or accesses a memory page of guest memory 195A-B it is actually using or accessing host memory 184.

For this reason, each of the first guest memory 195A and the second guest memory 195B are shown as physical portions of host memory 184. For example, a first portion of host memory 184 is allocated to the first guest memory 195A. A second portion of host memory 184 is allocated to the second guest memory 195B. A third portion of host memory 184 is allocated to additional host memory 205. For example, the additional host memory 205 may be re-allocated to the first guest memory 195A, the second guest memory 195B. Likewise, for example, the additional host memory 205 may be allocated to other components or systems (e.g., host operating system, guest memory associated with another virtual machine, etc.).

Each of the first guest virtual machine 170A and the second guest virtual machine 170B are sent a bus address offset. For example, the first guest memory 195A is sent a first bus address offset 201A. Likewise, for example, the second guest memory 195B is sent a second bus address offset 201B. Each of the first bus address offset 201A and the second bus address offset 201B are used to create results. For example, the first bus address offset 201A is used to create a first result 202A. Likewise, for example, the second bus address offset 201B is used to create a second result 202B. In an example embodiment, the first bus address offset 201A and the second bus address offset 201B are numerical multiples of one another (e.g., the first bus address offset 201A is a 2 GB offset and the second bus address offset 201B is a 4 GB offset, the first bus address offset 201A is a 3 GB offset and the second bus address offset 201B is a 9 GB offset, the first bus address offset 201A is a 2 GB offset and the second bus address offset 201B is a 10 GB offset, etc.).

In an example embodiment the first result 202A and the second result 202B are virtual-offset addresses. For example, host memory 184 has a fixed physical range (e.g., physical locations 0 GB to 100 GB). The first guest memory 195A is associated with a physical portion of host memory 184 (e.g., from physical locations 0 GB to 2 GB). The first guest memory 195A (e.g., virtual locations 0 GB to 2 GB, associated with physical locations 0 GB to 2 GB), unlike host memory 184, is on the first guest virtual machine 170A. In this sense, any address associated with the first guest virtual machine 170A (e.g., an address for first guest memory 195A) is a virtual address (e.g., a virtual address between virtual locations 0 GB and 2 GB on the first guest memory 195A is a physical address between 0 GB and 2 GB on the host memory 184). Using the first bus address offset 201A (e.g., a 3 GB offset), the virtual address becomes a virtual-offset address (e.g., a virtual address between virtual locations 0 GB and 2 GB is now a virtual-offset address between virtual locations 3 GB and 5 GB), which is the first result 202A.

Likewise, for example, the second guest memory 195B is associated with a physical portion of host memory 184 (e.g., from physical locations 2 GB to 4 GB). The physical portion of host memory 184 for the second guest memory 195B (e.g., physical locations 2 GB to 4 GB) is different from the physical portion of host memory 184 for the first guest memory 195A (e.g., physical locations 0 GB to 2 GB). The second guest memory 195B (e.g., virtual locations 0 GB to 2 GB, associated with physical locations 2 GB to 4 GB), unlike host memory 184, is on the second guest virtual machine 170B. In this sense, any address associated with the second guest virtual machine 170B (e.g., an address for second guest memory 195B) is a virtual address (e.g., a virtual address between virtual locations 0 GB and 2 GB on the second guest memory 195B is a physical address between physical locations 2 GB and 4 GB on the host memory 184). Using the second bus address offset 201B (e.g., a 6 GB offset), the virtual address becomes a virtual-offset address (e.g., a virtual address between virtual locations 0 GB and 2 GB is now a virtual-offset address between virtual locations 6 GB and 8 GB), which is the second result 202B.

In different example embodiments, results can be other types of addresses (e.g., real addresses, virtual addresses, etc.) and other types of location information (e.g., real address ranges, virtual address ranges, virtual-offset address ranges, etc.). To see how these results are used, by the hypervisor 180, the IOMMU 188, guest virtual machines 170A-B and the device 150A, a flow diagram is useful.

Figure 3A:
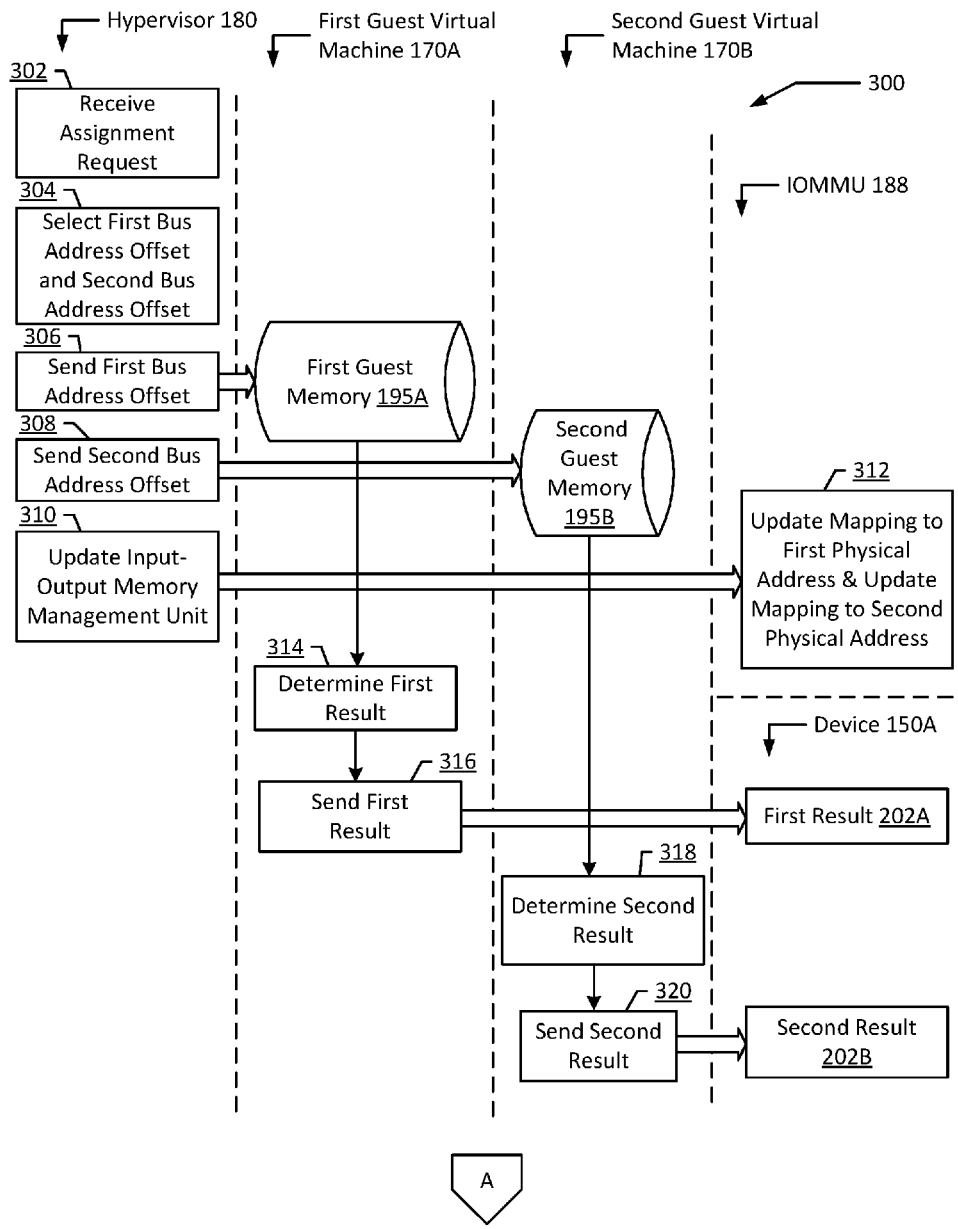
FIGS. 3A-B are a flow diagram illustrating device assignment with bus address offsets according to an example embodiment of the present disclosure.
Figure 3B:
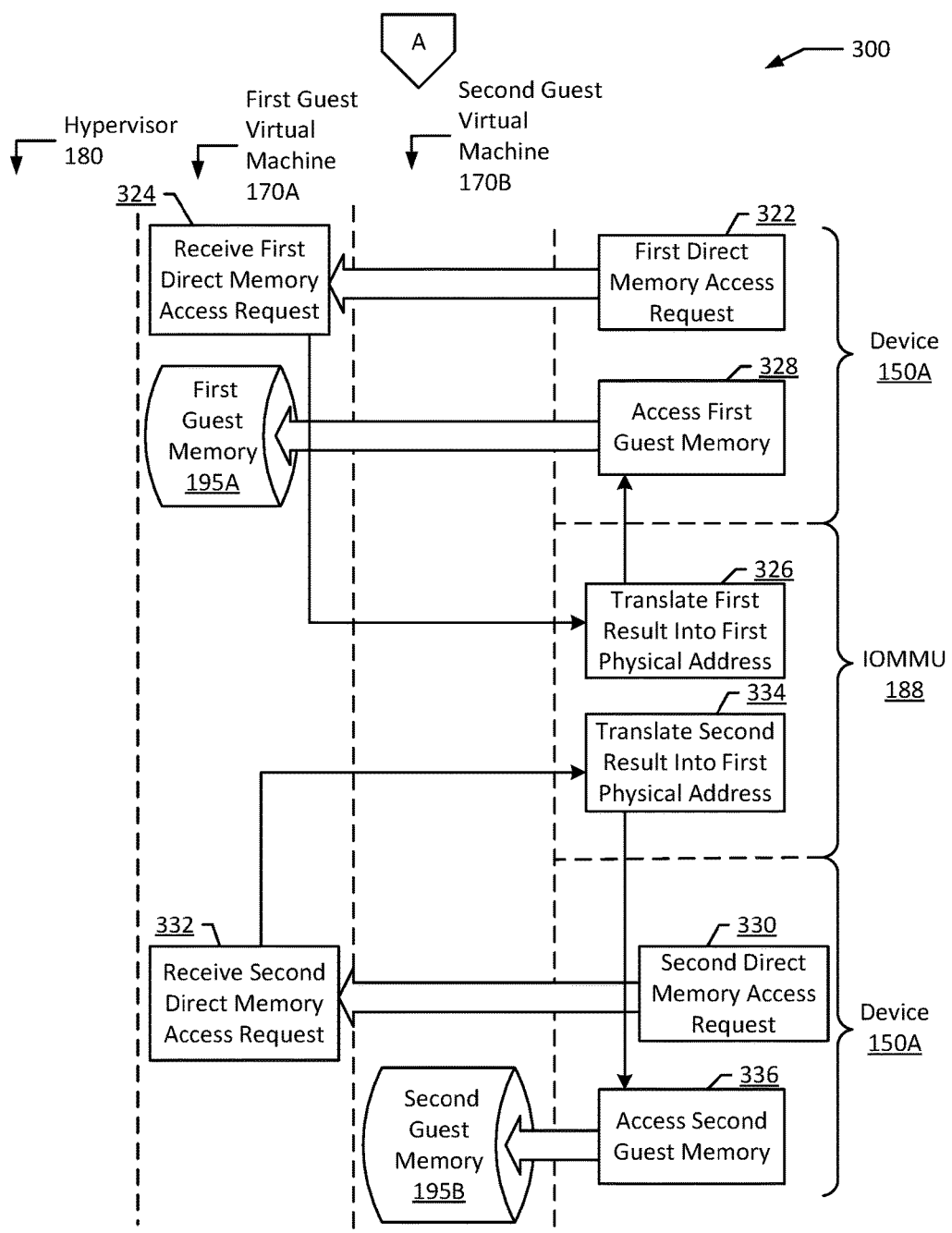

FIGS. 3A-B are a flow diagram illustrating an example method of device assignment with bus address offsets according to an example embodiment of the present disclosure. Although the example method 300 is described with reference to the flowchart illustrated in FIGS. 3A-B, it will be appreciated that many other methods of performing the acts associated with the method may be used. For example, the order of some of the blocks may be changed, certain blocks may be combined with other blocks, and some of the blocks described are optional. The method 300 may be performed by processing logic that may include hardware (circuitry, dedicated logic, etc.), software, or a combination of both.

In the illustrated example embodiment in FIG. 3A, a hypervisor 180 receives an assignment request (block 302). In an example embodiment, the assignment request is sent from an administrator. In a different embodiment, the assignment request is sent from an external device (e.g., device 150A). In another different example embodiment, each of the first guest virtual machine 170A and the second guest virtual machine 170B are on an assignment list. In this example embodiment, the assignment list dictates specifics regarding the assignment request, received by the hypervisor 180.

The assignment request is a request to assign a device (e.g., device 150A) to a plurality of guest virtual machines including at least a first guest virtual machine (e.g., VM 170A) and a second guest virtual machine (e.g., VM 170B). Each of the first guest virtual machine 170A and the second guest virtual machine 170B has guest memory that is associated with host physical memory 184 (e.g., a 100 GB range). For example, the first guest virtual machine 170A has a first guest memory 195A (e.g., a 2 GB range) associated with a portion of a host physical memory 184 (e.g., host memory 184 from physical locations 0 GB to 2 GB). This first guest memory 195 has a first physical address in the host physical memory 184 (e.g., a first physical address at physical location 1 GB in the host physical memory 184). Likewise, for example, the second guest virtual machine 170B has a second guest memory 195B (e.g., a 2 GB range) associated with a portion of the host physical memory 184 (e.g., host memory 184 from physical locations 2 GB to 4 GB) different from the first guest memory 195A. This second guest memory 195B has a second physical address in the host physical memory 184 (e.g., a second physical address at physical location 3 GB in the host physical memory 184). To recap, in this example, the first physical address is at physical location 1 GB in the host physical memory 184; the second physical address is at physical location 3G in the host physical memory 184.

The hypervisor 180 selects a first bus address offset 201A (e.g., a 3 GB offset) and a second bus address offset 201B (e.g., a 6 GB offset) (block 304). In an example embodiment, the second bus address offset 201B is different from the first bus address offset 201A. In a different example embodiment, the second bus address offset 201B is the same as the first bus address offset 201A. The hypervisor 180 sends the first bus address offset 201A (e.g., the 3 GB offset) to the first guest virtual machine 170A (block 306). In an example embodiment, the first bus address offset 201A is sent to the first guest memory 195A of the first guest virtual machine 170A (e.g., the 3 GB offset is sent to the 2 GB range associated with host memory 184 from physical locations 0 GB to 2 GB). Likewise, the hypervisor 180 sends the second bus address offset 201B (e.g., the 6 GB offset) to the second guest virtual machine 170B (block 308). In an example embodiment, the second bus address offset 201B is sent to the second guest memory 195B of the second guest virtual machine 170B (e.g., the 6 GB offset is sent to the 2 GB range associated with host memory 184 from physical locations 2 GB to 4 GB).

The hypervisor 180 updates an input-output memory management unit (IOMMU) 188 (block 310). More particularly, updating the IOMMU 188 involves updating a mapping to the first physical address and updating a mapping to the second physical address (block 312). This includes updating the mapping to the first physical address (e.g., physical location 1 GB in the host physical memory 184) to include the first bus address offset 201A (e.g., 3 GB offset). Likewise, this includes updating the mapping to the second physical address (e.g., physical location 3 GB in the host physical memory 184) to include the second bus address offset 201B (e.g., the 6 GB offset).

The first guest virtual machine 170A determines a first result 202A (block 314). Determining the first result 202A involves using both the first bus address offset 201A (e.g., the 3 GB offset) and a first guest address in the first guest memory 195A. The first guest address is the guest-equivalent to the first physical address location in host physical memory 184. For example, physical location 1 GB in the host physical memory 184 falls in the middle of the 2 GB physical range (e.g., physical locations 0 GB to 2 GB). Translating this 2 GB physical range to the 2 GB virtual range (e.g., virtual locations 0 GB to 2 GB) for first guest memory 195A, the first guest address is at virtual location 1 GB. Including the first bus address offset 201A (e.g., 3 GB offset), the first result 202A is determined (e.g., adding the first bus address offset 201A to virtual location 1 GB yields virtual location 4 GB). The first guest virtual machine 170A sends the first result 202A (e.g., virtual location 4 GB) to device 150A (block 316).

Likewise, the second guest virtual machine 170B determines a second result 202B (block 318). Determining the second result 202B involves using both the second bus address offset 201B (e.g., the 6 GB offset) and a second guest address in the second guest memory 195B. The second guest address is the guest-equivalent to the second physical address location in host physical memory 184. For example, physical location 3 GB in the host physical memory 184 falls in the middle of the 2 GB physical range (e.g., physical locations 2 GB to 4 GB). Translating this 2 GB physical range to the 2 GB virtual range (e.g., virtual locations 0 GB to 2 GB) for second guest memory 195B, the second guest address is at virtual location 1 GB. Including the second bus address offset 201B (e.g., 6 GB offset), the second result 202B is determined (e.g., adding the second bus address offset 201B to virtual location 1 GB yields virtual location 7 GB). The second guest virtual machine 170B sends the second result 202B (e.g. virtual location 7 GB) to device 150A (block 320).

To recap, in the example above, each of the first guest address and the second guest address are at virtual location 1 GB in the respective first guest memory 195A and second guest memory 195B, because each of the first guest memory 195A and the second guest memory 195B has a 2 GB virtual range. If the first guest virtual machine 170A and the second guest virtual machine 170B pass these guest addresses to the device 150A, the device would perceive both of the first guest address and the second guest address being at the virtual location 1 GB. The device would not be able to access the first guest virtual machine 170A and the second guest virtual machine 170B at the same time, because it would attempt to access the same address for both virtual machines (e.g., resulting in device access error). However, by using the first bus address offset 201A and the second bus address offset 201B, the first guest virtual machine 170A and the second guest virtual machine 170B pass the first result 202A (e.g., virtual location 4 GB) and the second result 202B (e.g., virtual location 7 GB) to the device 150A. In this way, the device is able to access the first guest virtual machine 170A and the second guest virtual machine 170B at the same time, because it accesses the first result 202A and the second result 202B, which are different virtual locations (e.g., no device access error).

Continuing on to FIG. 3B, the device 150A sends a first direct memory access request (block 322). In an example embodiment, the first direct memory access request is an access request to the first result 202A (e.g., virtual location 4 GB). This first direct memory access request is received by the first guest virtual machine 170A (block 324). For example, the device 150A attempts to access the first guest virtual machine 170A. Responsive to receiving the first direct memory access request, the IOMMU 188 translates the first result 202A (e.g., virtual location 4 GB) into the first physical address (block 326) (e.g., the first physical address location 1 GB in the host physical memory 184). Accordingly, this translation may be executed without hypervisor 180 intervention. The device 150A may then use the first physical address (e.g., physical location 1 GB in the host physical memory 184) to access the first guest memory 195A (e.g., first guest address 1 GB) (block 328).

Likewise, the device 150B sends a second direct memory access request (block 330). In an example embodiment, the second direct memory access request is an access request to the second result 202B (e.g., virtual location 7 GB). This second direct memory access request is received by the second guest virtual machine 170B (block 332). For example, the device 150B attempts to access the second guest virtual machine 170B. Responsive to receiving the second direct memory access request, the IOMMU 188 translates the second result 202B (e.g. virtual location 7 GB) into the second physical address (block 334) (e.g., the second physical address location 3 GB in the host physical memory 184). Accordingly, this translation may be executed without hypervisor 180 intervention. The device 150A may then use the second physical address (e.g., location 3 GB in the host physical memory 184) to access the second guest memory 195B (e.g., second guest address 1 GB) (block).

In an example embodiment, the device 150A accesses the first guest virtual machine 170A through the first guest memory 195A, and the second guest virtual machine 170B through the second guest memory 195B, at the same time in parallel (e.g., simultaneously). Likewise, in an example embodiment, the first guest virtual machine 170A has a first ring on the device 150A and the second guest virtual machine 170B has a second ring on the device 150A. Each of the first ring and the second ring may be a receiving ring and/or a transmission ring.

In an example embodiment, the first bus address offset 201A includes a first mask, associated with higher bits of the first physical address, which are not used by the first guest virtual machine 170A. Likewise, the second bus address offset 201B includes a second mask, associated with higher bits of the second physical address, which are not used by the second guest virtual machine 170B. For example, each of the first physical address of the host memory 184 and the second physical address of the host memory 184 are represented by 32-bit addresses (e.g., bits 1-32). The numerical representation for each of these physical addresses has additional bits that are not used to represent the physical addresses (e.g., bits 33-40). These additional eight bits may serve as virtual machine identifiers, allowing for a plurality of different virtual machines (e.g., 256 different virtual machines) to be readily identified. For example, the additional bits can be used to designate which virtual machine is associated with each physical address. Likewise, for example, the additional bits can be used to designate bus address offsets for particular virtual machines. In an example embodiment, a logical OR operation is used to identify each of the first guest virtual machine 170A and the second guest virtual machine 170B, by using the first mask and the second mask (e.g., the first result and the second result are determined, using the first mask and the second mask respectively). In a different example embodiment, the first mask and the second mask are included and identified through arithmetic functions (e.g., addition).

Figure 4A:
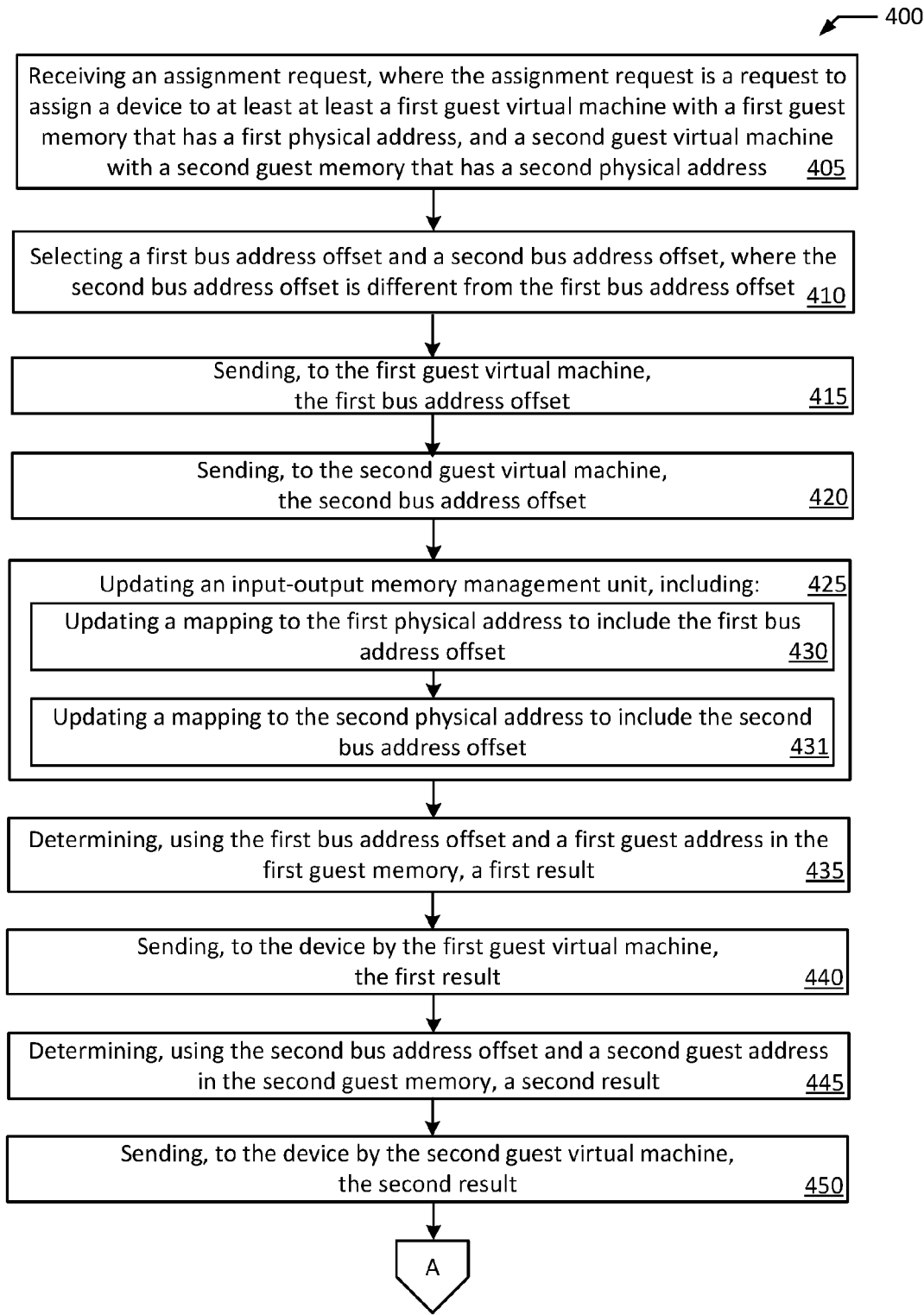
FIGS. 4A-B are a flowchart illustrating an example method of device assignment with bus address offsets according to an example embodiment of the present disclosure.
Figure 4B:
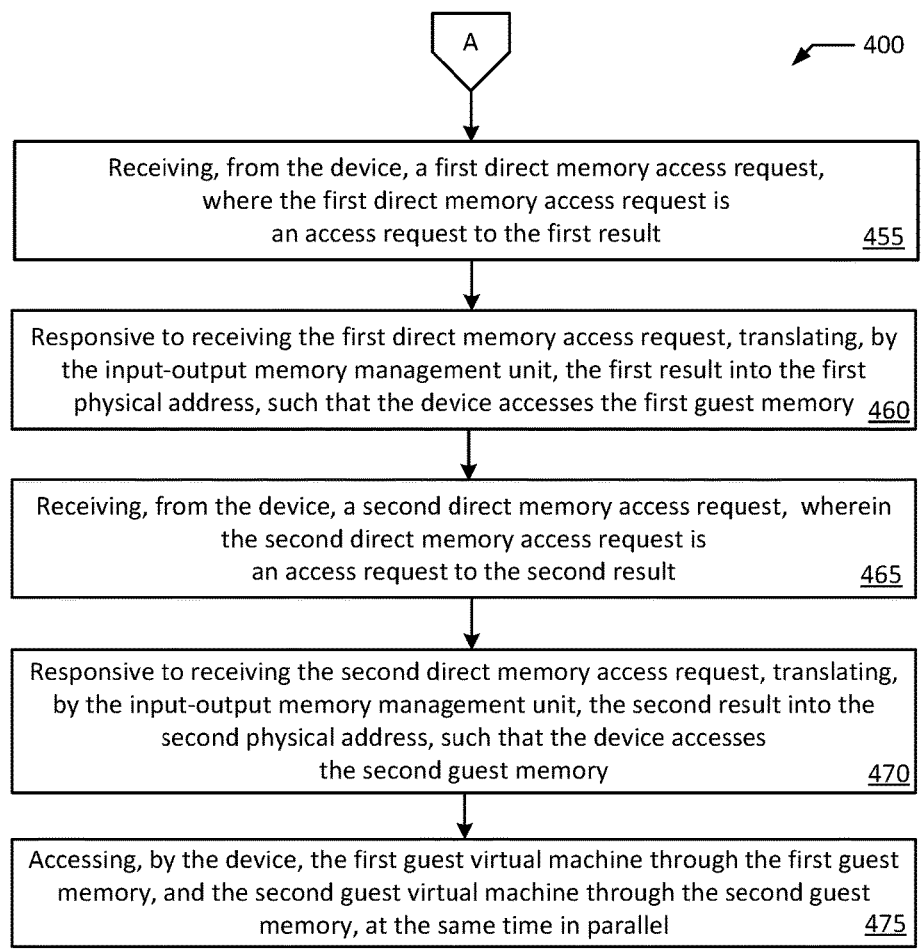

FIGS. 4A-B are a flowchart illustrating an example method of device assignment with bus address offsets according to an example embodiment of the present disclosure. Although the example method 400 is described with reference to the flowchart illustrated in FIGS. 4A-B, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may include hardware (circuitry, dedicated logic, etc.), software, or a combination of both. In an example embodiment, the method is performed by a hypervisor 180 interacting with an IOMMU 188, a first guest virtual machine 170A, a second guest virtual machine 170B and a device 150A. In other example embodiments, the method is performed by other memory systems (e.g., computer system 100, an external computer system, etc.)

The example method 400 starts with receiving an assignment request (block 405). The assignment request is a request to assign a device 150A to a plurality of guest virtual machines including at least a first guest virtual machine 170A and a second guest virtual machine 170B. The first guest virtual machine 170A has a first guest memory 195A associated with a portion of a host physical memory 184 and has a first physical address. The second guest virtual machine 170B has a second guest memory 195B associated with a portion of the host physical memory 184 different from the first guest memory 195A and has a second physical address. The method 400 further includes selecting a first bus address offset 201A and a second bus address offset 201B (block 410). The second bus address offset 201B is different from the first bus address offset 201A. In an example embodiment, responsive to selecting the first bus address offset 201A and the second bus address offset 201B, the hypervisor 180 locks the first guest memory 195A and the second guest memory 195B.

The method further includes sending, to the first guest virtual machine 170A, the first bus address offset 201A (block 415). The method further includes sending, to the second guest virtual machine 170B, the second bus address offset 201B (block 420). In an example embodiment, the bus address offsets are sent lazily. For example, the first bus address offset 201A is sent to the first guest virtual machine 170A in response to a direct memory access request, sent from the device 150A to the first guest virtual machine 170A. Likewise, for example, the second bus address offset 201B is sent to the second guest virtual machine 170B in response to a direct memory access request, sent from the device 150A to the second guest virtual machine 170B. In the lazy configuration, neither the first bus address offset 201A nor the second bus address offset 201B are sent until a direct memory access request is sent to the bus address offset's respective virtual machine (e.g., the first guest virtual machine 170A or the second guest virtual machine 170B).

The method further includes updating an input-output memory management unit (IOMMU) 188 (block 425). Updating the IOMMU includes updating a mapping to the first physical address to include the first bus address offset 201A (block 430). Updating the IOMMU further includes updating a mapping to the second physical address to include the second bus address offset 201B (block 431). In an example embodiment, the IOMMU 188 is updated lazily. For example, the first bus address offset 201A is mapped in response to a direct memory access request, sent from the device 150A to the first guest virtual machine 170A. Likewise, for example, the second bus address offset 201B is mapped in response to a direct memory access request, sent from the device 150A to the second guest virtual machine 170B. In the lazy configuration, neither the first bus address offset 201A nor the second bus address offset 201B are mapped until a direct memory access request is sent to the bus address offset's respective virtual machine (e.g., the first guest virtual machine 170A or the second guest virtual machine 170B).

The example method 400 further includes determining, using the first bus address offset 201A and a first guest address in the first guest memory 195A, a first result 202A (block 435). The example method 400 further includes sending, to the device 150A by the first guest virtual machine 170A, the first result 202A (block 440). The example method 400 further includes determining, using the second bus address offset 201B and a second guest address in the second guest memory 195B, a second result (block 445). The example method 400 further includes sending, to the device 150A by the second guest virtual machine 170B, the second result 202B (block 450).

The example method 400 further includes receiving, from the device 150A, a first direct memory access request, where the first direct memory access request is an access request to the first result (block 455). In an example embodiment, the first direct memory access request is received by the first guest virtual machine 170A. The example method 400 further includes, responsive to receiving the first direct memory access request, translating, by the IOMMU 188, the first result 202A into the first physical address, such that the device 150A accesses the first guest memory 195A (block 460).

The example method 400 further includes receiving, from the device 150A, a second direct memory access request, where the second direct memory access request is an access request to the second result (block 465). In an example embodiment, the second direct memory access request is received by the second guest virtual machine 170B. The example method 400 further includes, responsive to receiving the second direct memory access request, translating, by the IOMMU 188, the second result 202B into the second physical address, such that the device 150A accesses the second guest memory 195B (block 470). In an example embodiment, the device 150A accesses the first guest virtual machine 170A through the first guest memory 195A, and the second guest virtual machine 170B through the second guest memory 195B, at the same time in parallel (block 475). Likewise, in an example embodiment, the first guest virtual machine 170A has a first ring on the device 150A and the second guest virtual machine 170B has a second ring on the device 150A.

In an example embodiment, additional assignment requests may be received by the hypervisor 180. For example, hypervisor 180 receives an additional assignment request. The additional assignment request is a request to assign the device 150A to a third guest virtual machine with a third guest memory. The third guest memory is associated with a portion of the host physical memory that is different from the first guest memory 195A and the second guest memory 195B (e.g., a portion of additional host memory 205). The third guest memory has a third physical address. The hypervisor 180 selects a third bus address offset. The third bus address offset is different from the first bus address offset 201A and the second bus address offset 201B. The hypervisor 180 sends, to the third guest virtual machine, the third bus address offset. The hypervisor 180 updates the IOMMU 188. Updating the IOMMU 188 includes updating a mapping to the third physical address to include the third bus address offset. The third guest virtual machine determines, using the third bus address offset and a third guest address in the third guest memory, a third result. The third guest virtual machine sends, to the device 150A by the third guest virtual machine, the third result. The third guest virtual machine receives, from the device 150A, a third direct memory access request. The third direct memory access request is an access request to the third result. Responsive to receiving the third direct memory access request, the IOMMU 188 translates the third result into the third physical address, such that the device 150A accesses the third guest memory.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of device assignment, the method comprising:
receiving an assignment request, wherein the assignment request is a request to assign a device to a plurality of guest virtual machines including at least:

a first guest virtual machine with a first guest memory, the first guest memory associated with a portion of a host physical memory and having a first physical address, and a second guest virtual machine with a second guest memory, the second guest memory associated with a portion of the host physical memory different from the first guest memory and having a second physical address;

selecting a first bus address offset and a second bus address offset, wherein the second bus address offset is different from the first bus address offset;

sending, to the first guest virtual machine, the first bus address offset;

sending, to the second guest virtual machine, the second bus address offset; and updating an input-output memory management unit, including:

updating a mapping to the first physical address to include the first bus address offset, and updating a mapping to the second physical address to include the second bus address offset;

subsequent to updating the mapping to the first physical address and the second physical address, receiving, by the first guest virtual machine, a first direct memory access request to access a first result, wherein the first result comprises the first bus address offset and a first guest address in the first guest memory; and in response to receiving the first direct memory access request, translating, by the input-output memory management unit, the first result into the first physical address in order for the device to access the first guest memory.

2. The method of claim 1, further comprising:

determining, using the first bus address offset and the first guest address in the first guest memory, the first result;

sending, to the device by the first guest virtual machine, the first result;

determining, using the second bus address offset and a second guest address in the second guest memory, a second result; and sending, to the device by the second guest virtual machine, the second result.

3. The method of claim 2, further comprising:

responsive to receiving the first direct memory access request, translating, by the input-output memory management unit, the first result into the first physical address, such that the device accesses the first guest memory.

4. The method of claim 3, wherein the device accesses the first guest virtual machine through the first guest memory, and the second guest virtual machine through the second guest memory, at the same time in parallel.

5. The method of claim 3, wherein the first guest virtual machine has a first ring on the device and the second guest virtual machine has a second ring on the device.

6. The method of claim 3, further comprising:

receiving, from the device, a second direct memory access request, wherein the second direct memory access request is an access request to the second result;

responsive to receiving the second direct memory access request:

translating, by the input-output memory management unit, the second result into the second physical address, such that the device accesses the second guest memory;

wherein the device accesses the first guest virtual machine through the first guest memory, and the second guest virtual machine through the second guest memory, at the same time in parallel; and wherein the first guest virtual machine has a first ring on the device and the second guest virtual machine has a second ring on the device.

7. The method of claim 2, further comprising:

receiving an additional assignment request, wherein the additional assignment request is the request to assign the device to a third guest virtual machine with a third guest memory, the third guest memory associated with a portion of the host physical memory different from the first guest memory and the second guest memory and having a third physical address;

selecting a third bus address offset, wherein the third bus address offset is different from the first bus address offset and the second bus address offset;

sending, to the third guest virtual machine, the third bus address offset;

updating the input-output memory management unit by updating a mapping to the third physical address to include the third bus address offset;

determining, using the third bus address offset and a third guest address in the third guest memory, a third result;

sending, to the device by the third guest virtual machine, the third result;

receiving, from the device, a third direct memory access request, wherein the third direct memory access request is an access request to the third result; and responsive to receiving the third direct memory access request, translating, by the input-output memory management unit, the third result into the third physical address, such that the device accesses the third guest memory.

8. The method of claim 1, wherein the input-output memory management unit is updated lazily, such that the first bus address offset is mapped in response to a fourth direct memory access request, sent from the device to the first guest virtual machine, and the second bus address offset is mapped in response to a fifth direct memory access request, sent from the device to the second guest virtual machine.

9. The method of claim 1, wherein the first bus address offset includes a first mask, associated with higher bits of the first physical address which are not used by the first guest virtual machine, and wherein the second bus address offset includes a second mask, associated with higher bits of the second physical address which are not used by the second guest virtual machine.

10. The method of claim 9, wherein a logical OR operation is used to access each of the first guest virtual machine and the second guest virtual machine.

11. The method of claim 1, further comprising, responsive to selecting the first bus address offset and the second bus address offset, locking the first guest memory and the second guest memory.

12. The method of claim 1, wherein the assignment request is sent, to the hypervisor, from an administrator.

13. The method of claim 1, wherein each of the first guest virtual machine and the second guest virtual machine are on an assignment list.

14. The method of claim 1, wherein the first bus address offset and the second bus address offset are numerical multiples of one another.

15. The method of claim 14, wherein the first bus address offset has a 3 GB offset and the second bus address offset has a 6 GB offset.

16. A system of device assignment, the system comprising:
a memory;
one or more processors, in communication with the memory;
a device;
a first guest virtual machine with a first guest memory, the first guest memory associated with a portion of a host physical memory and having a first physical address, configured to execute on the one or more processors;
a second guest virtual machine with a second guest memory, the second guest memory associated with a portion of the host physical memory different from the first guest memory and having a second physical address, configured to execute on the one or more processors;
an input-output memory management unit; and
a hypervisor, configured to execute on the one or more processors, to:
receive an assignment request, wherein the assignment request is a request to assign the device to a plurality of guest virtual machines including at least the first guest virtual machine and the second guest virtual machine;
select a first bus address offset and a second bus address offset, wherein the second bus address offset is different from the first bus address offset;
send, to the first guest virtual machine, the first bus address offset;
send, to the second guest virtual machine, the second bus address offset; and
update the input-output memory management unit, including:
updating a mapping to the first physical address to include the first bus address offset, and
updating a mapping to the second physical address to include the second bus address offset,
wherein, subsequent to updating the mapping to the first physical address and the second physical address, the first guest virtual machine receives a first direct memory access request to access a first result, wherein the first result comprises the first bus address offset and a first guest address in the first guest memory, and
wherein, in response to receiving the first direct memory access request, the input-output memory management unit translates the first result into the first physical address in order for the device to access the first guest memory.

17. The system of claim 16, further comprising:
wherein the first guest virtual machine determines, using the first bus address offset and the first guest address in the first guest memory, the first result;
wherein the first guest virtual machine sends, to the device, the first result;
wherein the second guest virtual machine determines, using the second bus address offset and a second guest address in the second guest memory, a second result;
wherein the second guest virtual machine sends, to the device, the second result;
wherein responsive to receiving the first direct memory access request, the input-output memory management unit translates the first result into the first physical address, such that the device accesses the first guest memory; and
wherein the device accesses the first guest virtual machine through the first guest memory, and the second guest virtual machine through the second guest memory, at the same time in parallel.

18. The system of claim 16, wherein the hypervisor is further configured, responsive to selecting the first bus address offset and the second bus address offset, to lock the first guest memory and the second guest memory.

19. The system of claim 16, wherein the first bus address offset and the second bus address offset are numerical multiples of one another.

20. A computer-readable non-transitory storage medium comprising executable instructions that, when executed, are configured to cause a hypervisor to:
receive an assignment request, wherein the assignment request is a request to assign a device to a plurality of guest virtual machines including at least:
a first guest virtual machine with a first guest memory, the first guest memory associated with a portion of a host physical memory and having a first physical address, and
a second guest virtual machine with a second guest memory, the second guest memory associated with a portion of the host physical memory different from the first guest memory and having a second physical address;
select a first bus address offset and a second bus address offset, wherein the second bus address offset is different from the first bus address offset;
send, to the first guest virtual machine, the first bus address offset;
send, to the second guest virtual machine, the second bus address offset; and
update an input-output memory management unit, including:
updating a mapping to the first physical address to include the first bus address offset, and
updating a mapping to the second physical address to include the second bus address offset,
wherein, subsequent to updating the mapping to the first physical address and the second physical address, the first guest virtual machine receives a first direct memory access request to access a first result, wherein the first result comprises the first bus address offset and a first guest address in the first guest memory, and
wherein, in response to receiving the first direct memory access request, the input-output memory management unit translates the first result into the first physical address in order for the device to access the first guest memory.

* * * * *